No. 729,927. PATENTED JUNE 2, 1903.
W. M. FULTON.
COLLAPSIBLE VESSEL FOR ATMOSPHERIC MOTORS.
APPLICATION FILED NOV. 27, 1901.
NO MODEL.
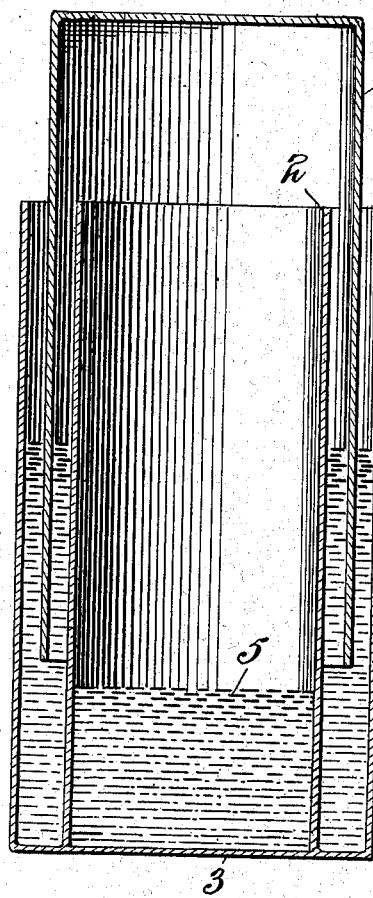
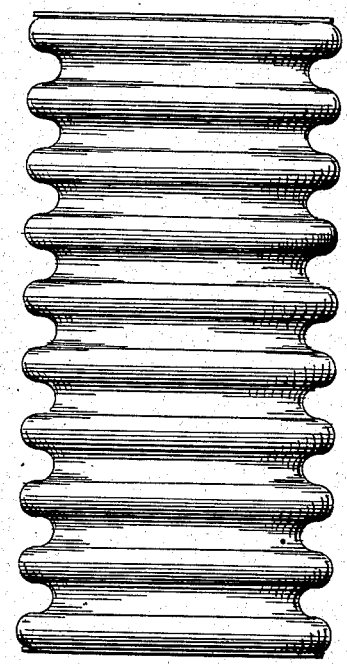
Fig. 1.
Fig. 2.
Witnesses.
Chas. K. Davies.
N. B. Kirkam
Inventor.
Weston M. Fulton
By
Attorney.

No. 729,927. Patented June 2, 1903.

UNITED STATES PATENT OFFICE.

WESTON M. FULTON, OF KNOXVILLE, TENNESSEE.

COLLAPSIBLE VESSEL FOR ATMOSPHERIC MOTORS.

SPECIFICATION forming part of Letters Patent No. 729,927, dated June 2, 1903.

Application filed November 27, 1901. Serial No. 83,848. (No model.)

*To all whom it may concern:*

Be it known that I, WESTON M. FULTON, a resident of Knoxville, Tennessee, have invented a new and useful Improvement in Collapsible Vessels for Atmospheric Motors, which invention is fully set forth in the following specification.

My invention relates to atmospheric motors, and more particularly to the expansive fluid or mixture used in the collapsible vessels through which the force due to changes in atmospheric conditions is transmitted to the motor. It is a matter of great importance in motors of this character that the expansive agent should be such that when placed in a collapsible vessel it will cause the vessel to reach its extreme limits of expansion and contraction when the atmospheric conditions have reached their extreme limits, and many efforts have heretofore been made to obtain an expansive agent that would conform to these ideal conditions. In my United States Patent No. 685,269 and in my applications Serial No. 48,852, filed February 25, 1901, and Serial No. 80,304, filed October 28, 1901, I have described various expansive agents or mixtures for use in collapsible vessels in which several mixtures, solids, liquids, gases, or saturated vapors enter in various combinations. Now I have discovered that if one or more non-saturated vapors enter into the expansive mixture employed in the collapsible vessel the efficiency of the device as a whole is in many instances greatly increased and the collapsible vessel can be made to more nearly respond to the ideal conditions mentioned above—*i. e.*, reach the limits of expansion and contraction coincident with the extreme limits in atmospheric variations.

Any suitable collapsible vessel may be employed in utilizing the present invention, and for the purpose of illustration I have shown two such vessels in the accompanying drawings, in which—

Figure 1 is a vertical section of one form of collapsible vessel, and Fig. 2 is a side elevation of another form.

Referring to Fig. 1, 1 and 2 are cylinders of different diameters and having a common base 3, and 4 is a third cylinder of a diameter intermediate between cylinders 1 and 2 and inverted with its open end in some fluid seal, as mercury, between cylinders 1 and 2, as shown. The cylinders may be of any suitable substance, as glass or sheet metal. The vessel of Fig. 2 is one having rigid end walls and side walls of some corrugated flexible material, as sheet metal. Suppose either of these vessels—for example, that of Fig. 1—to have one end, as 3, fastened to a fixed support, while the other end is connected with some mechanism which offers resistance to its motion in the direction of the dimension of the vessel measured between the base 3 and the top of cylinder 4. It is evident that the load should be so applied through gearing that it will offer but slight resistance to the motion of the vessel. Now suppose the vessel to contain some expansive mixture, as ether 5, and its saturated vapor at temperature $t$ and pressure $p$. If the temperature should rise $(t+x)$ degrees, the tension of the vapor will increase to $(p+y,)$ and as it is a saturated vapor it will expand without decrease of pressure, and since the load on the vessel offers but slight resistance to its motion the vessel will expand to its maximum limit. If now the temperature should continue to rise and remain above $(t+x)$ degrees for any considerable length of time, the vessel having reached its maximum expansion at $(t+x)$ degrees could not respond to the increase in temperature by expansion and would therefore impart no motion to the motor as the result of such increase of temperature above $(t+x)$ degrees. The motor would therefore remain idle till the temperature fell below $(t+x)$ degrees, provided the atmospheric pressure remained constant. By a similar course of reasoning it can be demonstrated that a decided fall in temperature or decided changes in atmospheric pressure would find the vessel unable to fully respond thereto. By my invention I overcome this objection by adding a non-saturated vapor to the expansive mixture in the collapsible vessel—such, for example, as the non-saturated vapor of benzin—and I then have within the vessel any suitable expansive agent or mixture (which in the instance chosen for illustration is ether and its saturated vapor) mixed with any other suitable non-saturated vapor, as benzin. Assume again, with this non-saturated vapor present, that at temperature $t$ the pressure is $p$. If now the temperature should rise to $(t+x)$ degrees, the non-saturated vapor of benzin would expand with decrease of tension and would thus check the expansion of the saturated vapor of ether before the vessel reaches its maximum volume. It will be evident that by properly adjusting the amount of non-saturated vapor in the vessel the expansion of the saturated vapor may be practically confined within any desired limits. With a saturated and a non-saturated vapor confined in a vessel a rise in temperature would cause a vaporization of the liquid from which the saturated vapor comes and would expand the saturated vapor if the non-saturated vapor had no counteracting effect; but as the increase in the amount of saturated vapor will not result in any increase of tension and as the non-saturated vapor will have its tension increased as a result of the increase in the temperature this increase of tension on the part of the non-saturated vapor will retard the formation of saturated vapor from its liquid, thereby causing the vessel to expand more slowly. By properly proportioning the saturated and non-saturated vapors the expansion and contraction of the vessel may be so controlled that the limits of expansion and contraction shall only be reached at the extremes of atmospheric variations, and the vessel will therefore always be in condition to do work in response to all atmospheric variations between such extremes, which would not be the case in the absence of the non-saturated vapor. As a further illustration, suppose the collapsible vessel to contain some liquid, as water, and non-saturated vapor of alcohol at temperature $t$ and pressure $p$. If the temperature should fall, the water would absorb some of the vapor, and thus allow the pressure of the atmosphere acting upon the exterior surface of the vessel to contract it somewhat. If the temperature should now rise, the water would give off some of the alcohol-vapor, and thereby cause the vessel to expand. Changes in atmospheric pressure would produce similar results.

Other examples than the foregoing might be given to illustrate the principle of my invention, which is that of modifying, controlling, or facilitating the action of the expansible mixture or agent in the collapsible vessel by the use of a non-saturated vapor; but said examples are sufficient to demonstrate that non-saturated vapors may often be advantageously employed in connection with the expansive mixture or agent in the collapsible vessel of atmospheric motors.

It is to be expressly understood that the invention is not limited to the use of the non-saturated vapor of benzin in connection with the expansive mixture or agent in the collapsible vessel, as many other non-saturated vapors may be so employed without departing from the spirit of the invention. Among the non-saturated vapors which I have found to be best suited for this purpose are those of benzin, chloroform, alcohol, and ether.

Having thus described my invention, I claim—

1. In an atmospheric motor, a collapsible vessel containing an expansive agent and a non-saturated vapor which will remain non-saturated under the extreme variations of atmospheric conditions.

2. In an atmospheric motor, a collapsible vessel containing a non-saturated vapor which will remain non-saturated under the extreme variations of atmospheric conditions.

3. In an atmospheric motor, a collapsible vessel containing ether and its saturated vapor, together with a non-saturated vapor.

4. In an atmospheric motor, a collapsible vessel containing a saturated vapor and a non-saturated vapor which will remain non-saturated under the extreme variations of atmospheric conditions.

5. In an atmospheric motor, a collapsible vessel containing a saturated vapor in the presence of its liquid, and a non-saturated vapor which will remain non-saturated under the extreme variations of atmospheric conditions.

6. In an atmospheric motor, a collapsible vessel containing ether and its saturated vapor, together with the non-saturated vapor of benzin.

In testimony whereof I have signed this specification in the presence of two subscribing witnesses.

WESTON M. FULTON.

Witnesses:
J. W. HALL,
MYRTLE CRAWFORD.